July 29, 1958     A. ODERMATT     2,844,833
SHOE WITH A LEATHER SOLE AND/OR HEEL PROVIDED WITH RUBBER INSERTS
Filed Aug. 31, 1956
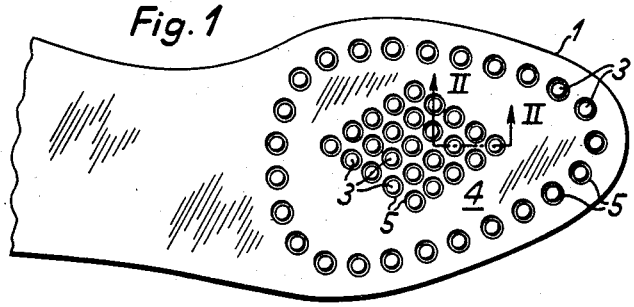
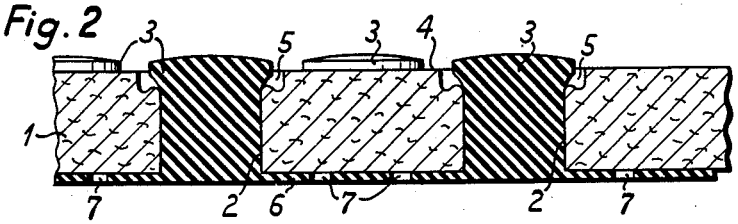
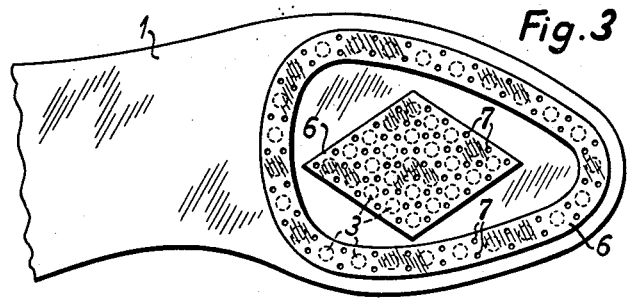
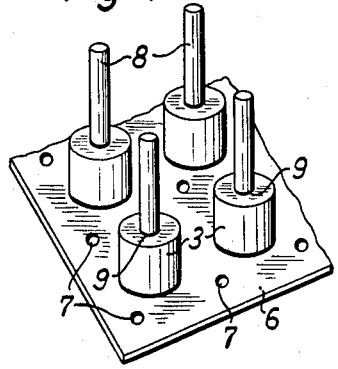
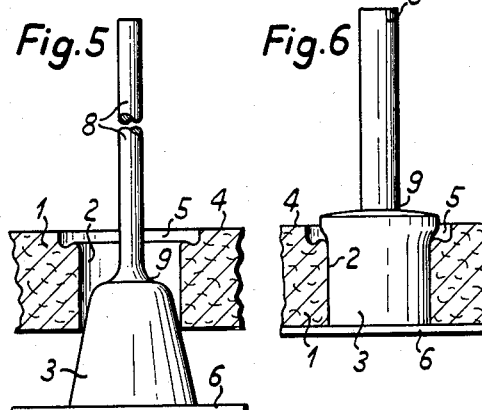
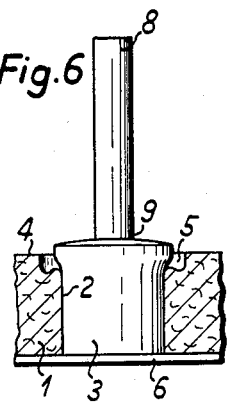

United States Patent Office 2,844,833
Patented July 29, 1958

2,844,833

SHOE WITH A LEATHER SOLE AND/OR HEEL PROVIDED WITH RUBBER INSERTS

Alois Odermatt, Zurzach, Switzerland

Application August 31, 1956, Serial No. 607,507

Claims priority, application Switzerland August 4, 1956

1 Claim. (Cl. 12—146)

The present invention relates to a shoe with leather sole and/or heel provided with rubber inserts.

It is known, for instance in order to reduce the liability to slip, to fix rubber parts to leather soles, for instance by adhesives, screws, etc., or to insert knob-shaped rubber parts into recesses in the outer surface of leather soles and fix them with obliquely running pins, so that the rubber parts project somewhat beyond the outer surface of the leather sole (German Patent No. 543,869). Further it is known to form the leather sole with an opening extending therethrough, and to insert in it a correspondingly shaped, profiled rubber plate corresponding to the thickness of the leather, this plate having, on the back of the outsole, a thin flange running along the groove and stuck and sewn to the leather. Thereby adhesive is introduced into the groove itself. The drawbacks of these constructions consist in that when inserted rubber parts are adopted they are not fixed reliably enough, and when rubber parts are laid onto the leather sole they alone are walked on and they alone become worn.

In contrast to that, in the case of a shoe according to the present invention the leather sole has several holes extending through it, into which rubber plugs are inserted in a self-locking manner with the plugs projecting, and project somewhat beyond the outer surface of the outsole.

Further the present invention relates to a particularly advantageous method of making such a shoe and wherein the leather part of the shoe, serving as the outsole, is provided with holes extending therethrough before being attached to the other parts of the shoe, which holes have a counterbore or widening opening at the outer surface of the outsole, and rubber plugs, whose cross-section is greater than the cross-section of the holes, are drawn into these holes, this drawing-in being effected, for example, by means of extensions of the plugs projecting through the holes and adapted to be later separated from the plugs.

The above, and other objects, features and advantages of the invention, will be apparent in the following detailed description of an illustrative embodiment which is to be read in connection with the accompanying drawing forming a part hereof, and wherein:

Fig. 1 is a view of the outer surface of an outsole according to the present invention, Fig. 2 is a section along the line II—II in Fig. 1 on a larger scale, Fig. 3 is a view of the back or inside surface of the sole on the same scale as in Fig. 1, Fig. 4 is a perspective representation of a part of a rubber sheet with plugs fixed on it before being inserted into the holes of the sole, Fig. 5 is an enlarged sectional view showing a plug being drawn into a hole in the leather sole, and Fig. 6 is a view similar to that of Fig. 5, but showing the plug in its final position in the hole.

The leather outsole 1 illustrated in the figures has holes 2 extending therethrough and, into which rubber plugs 3 are inserted in a self-locking manner. The holes 2 are bored and provided with a counterbore or widening 5 running into the outer surface 4. As can be seen from Fig. 2, the rubber plugs project solewhat beyond the outer surface of the outsole 1. The self-locking of the plugs 3 is effected by their cross-section in the unclamped state being greater than the cross-section of the holes 2, so that the part of the plugs projecting out of the holes is widened like a head (see Fig. 2), whereby it extends partly into the counterbore or widening 5.

On the back of the sole, rubber sheets 6 are provided, each being integral with a group of rubber plugs 3 and having a plurality of small openings 7, so that the permeability to air of the leather sole is not unnecessarily adversely affected. According to an especially advantageous, first method of making such a shoe, these plugs 3 are brought into the holes 2 in the following manner:

The extensions 8, illustrated in Figs. 4 to 6 and formed integral with the plugs 3, are passed through the holes 2, after which the free ends of the extensions are held. By means of these extensions the plugs are now drawn into the holes 2 until the rubber sheet 6 lies on the back of the leather sole. This drawing-in is rendered possible since the rubber plug is extended lengthways with simultaneous reduction of its cross-section, as represented in Fig. 5. This drawing-in, which is effected before fixing the leather outsole 1 to other parts of the shoe, can be done by hand or by machine. When the extensions 8 are let go, the plugs 3 endeavour to resume their original shape and thus become automatically locked in the holes 2.

The plugs are arranged on the sheet 6 in a pattern which corresponds to the pattern of the holes present in the sole, so that the extensions of all plugs connected with a rubber sheet can be passed simultaneously through the holes 2. The extensions 8 are preferably left on the plugs 3 until the making of the whole shoe has been finished, in order to prevent the sole from being dirtied if the shoe is laid down on something that is not clean. The extensions 8 are then severed at their roots, at the place 9 in Fig. 6, for instance by means of scissors, so that no remnants are left on the plugs.

It is possible to spread an adhesive over the side of the sheet from which the plugs 3 extend, so that the sheet 6 adheres well to the leather sole 1 after the plugs 3 have been drawn into the holes 2. Further it is possible to secure the plugs 3 in their position in the holes by providing the shoe with an intermediate sole, which lies against the back of the leather sole 1 covered with the sheets 6. Thus, during normal use, the plugs 3 can under no circumstances be pushed towards the inside of the shoe. It would, however, also be possible, instead of having an intermediate sole, to make the sheet 6 itself so thick that the desired strength is attained.

The widenings 5 have the purpose of considerably reducing the wear of the plugs. This advantage results from the fact that, when the shoes are in use, the projecting part of each plug is pressed into the opening 5 because of the weight of the person pressing on it, so that this part of the plug has a certain amount of free movement. If, in addition, horizontal forces occur which endeavour to displace the sole on the floor, these movable plug parts can deviate laterally in the widenings and in this manner offer a resistance to the displacing movement of the sole, without slipping on the floor. Thus, in consequence of the presence of the widenings 5, the adverse sliding friction, which causes excessive wear, is to a great extent prevented, and this explains the unexpectedly great durability of the sole. In this respect it has also to be noted that the weight of the person is only partly taken by the plugs, since these are pressed only into the plane of the surface of the leather sole, and the rest of the load is taken by the leather sole itself. Thus also the leather sole as such is subjected only to diminished wear, since it has not to take the whole weight of the person.

Further, the presence of the widenings 5 makes it absolutely impossible for a plug to be pushed into its hole. Since the plug is pressed together axially when in use, the plug end that is indeed already widened, will widen still farther, in that it expands into the widening 5, so that, under consideration of the incompressibility of the rubber, it is impossible to force this greatly widened part of the plug into the actual hole 2.

If no widenings 5 were present, when the shoe is in use the projecting plug part could not yield until it is disposed in the plane of the leather surface, but would be strongly squeezed together and partly spread out over the edge of the hole onto the leather surface, assuming somewhat the shape of a flat nail-head. The freedom of movement of this part of the plug would thus be greatly limited, and it would therefore be to a greater extent subjected to an injurious sliding friction on the floor. In addition to that, the plugs would have to take over the greater part of the weight of the person, since they would act as spacers between the floor and the leather sole. The projecting ends of the plugs would consequently wear rapidly and would then be seated in the holes flush with the leather surface, so that from this moment the danger is rapidly increased that a plug may be pushed into its hole. Then also the plugs could no longer properly perform their function, namely to increase the certainty of the shoe against slipping.

Although, as is evident, the widenings offer certain advantages, they do not form a necessary feature of the present invention, since even without these widenings excellent shoes can be made by using sufficiently strong material. Solely by the presence of the plugs, the agreeable permeability to air of the leather sole is combined with the non-slipping quality of a rubber sole, whereby the certainty against slipping is ensured not only because of the good adhesion of the rubber to the floor, but also because of the unevennesses produced by the projecting plugs. The effect of these unevennesses becomes particularly evident when walking on snow.

In consequence of the holes 2 in the leather sole, the latter is appreciably more flexible than a corresponding sole without holes. This increased flexibility is also a desired and advantageous feature of the described shoe.

Further, it must be noted that the described sole is just as waterproof as a leather sole without holes. Since the plugs in consequence of their elasticity lock themselves in the holes, it is impossible for water to pass through the joints along the surface of the plugs.

In order to ensure that the rubber plugs are self-locking in their holes and that the plugs cannot spring out of their holes because of the continuous bending up and down, of the sole when in use, the cross-section of a plug is with advantage kept less than about ten times the square of the length of the plug. When using a leather outsole 4 mm. thick, a rubber plug may be about 5 mm. long. It thus projects about 1 mm. beyond the leather surface. The square of the length amounts to 25 mm.$^2$. If the cross-section of a cylindrical plug does not exceed about 250 mm.$^2$, the plug has a diameter of approximately 18 mm. Preferably the diameter of a round plug with a length of 5 mm. is about 6 to 7 mm., and the diameter of the hole is about ½ mm. less.

Instead of circular cross-sections for the plugs, also oval or angular cross-sections could be adopted, and then the leather sole must of course be provided with holes of corresponding shapes. Further, the plugs could also in their relaxed state be thickened at their free end like a head, so that the part of the plug projecting out of the hole is still more distinctly thickened, as is shown in Figs. 2 and 6. By means of the extensions 8, even such plugs can at once be drawn into the holes.

Finally, instead of being connected together in groups on a sheet of rubber, the plugs could each have a flange-like edge which lies against the back of the leather sole. The plug is then held in the hole like a rivet, in that it has a widening at both ends.

The rubber plugs illustrated in the drawing may be made, for instance, of non-colored rubber or of other qualities of rubber possessing sufficient elasticity. It is then also possible to use plugs of various colours, so that, in addition to the pattern produced by the arrangement of the plugs, colour effects may be obtained which help to promote sales.

It is evident that the described plugs can be adopted not only in soles but also in heels, and are suitable with the same advantages for shoes for men, women and children.

What is claimed is:

A method of inserting rubber plugs into holes extending through an outsole of a shoe and having cross-sectional areas smaller than the normal cross-sectional areas of the rubber plugs; comprising the steps of providing an integral extension on each plug projecting axially from the latter and having a relatively smaller cross-sectional area, initially passing said extension of each plug through the related hole of the outsole, pulling axially on said extension so that the resistance to the entry of the plug into the hole results in axial elongation of the plug and a corresponding reduction of its cross-sectional area sufficient for insertion of the plug into the related hole, releasing the axial pull on the extension of each plug following the insertion of the latter in the related hole to permit the cross-sectional area of the inserted plug to expand within the hole for locking the plug in the outsole, and then severing said extensions from said plugs.

References Cited in the file of this patent

UNITED STATES PATENTS

| | | |
|---|---|---|
| 416,861 | Scafe | Dec. 10, 1889 |
| 1,122,681 | Bushell | Dec. 29, 1914 |
| 1,123,503 | Durgin | Jan. 5, 1915 |
| 1,329,524 | Hill | Feb. 3, 1920 |
| 1,422,716 | Jones | July 11, 1922 |
| 1,601,700 | Morrison | Sept. 28, 1926 |
| 1,749,351 | McQueen | Mar. 4, 1930 |
| 2,095,931 | Kraft | Oct. 12, 1937 |

FOREIGN PATENTS

| | | |
|---|---|---|
| 858,242 | France | Nov. 20, 1940 |